United States Patent Office 3,100,805
Patented Aug. 13, 1963

3,100,805
PROCESS FOR MAKING NITROCYCLOPROPANE
Paul G. Bay, Skokie, Ill., assignor to Abbott Laboratories, North Chicago, Ill., a corporation of Illinois
No Drawing. Filed June 4, 1962, Ser. No. 199,661
5 Claims. (Cl. 260—644)

The present invention is concerned with a new process for the preparation of nitrocyclopropane. More particularly, it is concerned with the ring closure of 1-halo-3-nitropropanes to yield nitrocyclopropane.

Nitrocyclopropane is an important building block in the preparation of cyclopropylamine which, in turn, is a valuable intermediate for the manufacture of a number of pharmaceutical products including tranquilizers, muscle relaxants, etc.

It is an object of the present invention to produce nitrocyclopropane from substituted aliphatic propanes. It is a further object to produce nitrocyclopropane from inexpensive starting materials. Another object of the present invention is the preparation of nitrocyclopropane at economical yields. Other objects will be apparent from the following disclosure and the appended claims.

These objects are accomplished by converting a major portion of 1-chloro-3-nitropropane into 1-iodo-3-nitropropane and subsequently converting the reaction mixture containing a major proportion of 1-iodo-3-nitropropane into nitrocyclopropane in the presence of an alkali metal amide in liquid ammonia. Since this reaction involves the use of liquid ammonia, the reaction mixture initially is at a temperature below −33° C. and remains at this temperature until all ammonia has evaporated.

In a simple embodiment, 1-chloro-3-nitropropane is refluxed with sodium iodide in acetone for several hours and the resulting mixture is distilled under reduced pressure to yield 1-iodo-3-nitropropane. The actual yield of 1-iodo-3-nitropropane obtained depends on the purity of the 1-chloro-3-nitropropane used as starting material and the refluxing period with sodium iodide. The reaction mixture containing this 1-iodo-3-nitropropane together with a minor proportion of unreacted 1-chloro-3-nitropropane is then stirred for several hours in liquid ammonia in the presence of an alkali metal amide. The liquid ammonia is allowed to slowly evaporate after this reaction, and the reaction mixture is extracted with an organic solvent such as ether.

The actual starting material for the process of the present invention is 1-iodo-3-nitropropane. It can be prepared from nitropropane by various methods of which the following appears very suitable: a mixture of 9.56 kg. (108.5 moles) of nitropropane and 40 grams of phosphorous pentoxide is stirred for 45 minutes while chlorine gas is bubbled therethrough at a temperature of 26–33° C. to displace oxygen from the reaction flask. After replacing all oxygen in the reaction vessel, six sunlamps (General Electric's RS-type) are directed toward the reaction vessel and chlorine gas bubbling is continued. During the first hour, the temperature rises to 108° and thereafter remains at this temperature. The reaction is continued for 55 hours in which time 3.016 kg. of chlorine (85 moles) are used. The crude reaction mixture weighs 12.38 kg. and analyzes 35.7% (4.42 kg) of 1-chloro-3-nitropropane, 22% of unreacted nitropropane, and 42.3% of other chlorinated nitropropanes such as 2-chloro-1-nitropropane, polychloronitropropanes, and 1-chloro-1-nitropropane. This mixture is stripped of unreacted nitropropane, and the lower boiling products such as 1-chloro-1-nitropropane are distilled off at 37–75 mm. of pressure and 75–90° C. The residue in the still is a mixture containing 65% 1-chloro-3-nitropropane.

Of the above 65% pure 1-chloro-3-nitropropane, 380 grams are added to a solution of 450 grams of sodium iodide in 2300 ml. of acetone. The mixture is stirred under reflux conditions for 18 hours, after which time acetone is removed by distillation, first at atmospheric pressure and later under reduced pressure. The residue is quenched in water and the bottom layer is separated and washed three times with water, and dried overnight over anhydrous magnesium sulfate. An analysis of this mixture shows it to contain 50.0% of 1-iodo-3-nitropropane and 15.2% of unreacted 1-chloro-3-nitropropane. Based on this analysis, 281 grams of this mixture represents 1 mole of 1-halo-3-nitropropane of which about 76% by weight (or 0.657 mole) is 1-iodo-3-nitropropane.

An alternate method of isolating crude 1-iodo-3-nitropropane consists in vacuum distillation of the reaction mixture. The desired fraction boils at 1 mm. pressure at 80–82° C. This fraction then contains about 70% 1-iodo-3-nitropropane and about 10% 1-chloro-3-nitropropane which, together with other chlorinated nitropropanes, distills azeotropically with the main fraction.

It is to be understood that those skilled in the art will know of many variations and alternate methods of producing 1-iodo-3-nitropropane or mixtures of 1-halo-3-nitropropane containing a major proportion of 1-iodo-3-nitropropane admixed with 1-chloro-3-nitropropane or 1-bromo-3-nitropropane.

For better understanding, the actual propcess of the present invention is illustrated below by reference to specific examples which are not intended to limit the invention in any respect.

*Example 1*

Within a period of 16 minutes, 43 grams of the above mixture of 1-halo-3-nitropropanes containing 70% 1-iodo-3-nitropropane (0.14 mole) and 10% 1-chloro-3-nitropropane (0.035 mole) is dripped into a stirred mixture of 4.6 grams of lithium amide (0.2 mole) in 300 ml. of liquid ammonia. The mixture is stirred for 16 hours whereby ammonia evaporates. To the remaining liquid, 500 ml. of anhydrous ether is added and the mixture is filtered. The ether is stripped from the filtrate and the residual liquid is distilled at 10 mm. pressure producing a yield of 87% (based on total 1-halo-3-nitropropanes used) of the theoretical amount of nitrocyclopropane, boiling at 36° C. An analytical sample shows 41.5% C, 5.83% H, 15.9% N and 36.67% O, which corresponds closely to the calculated values for nitrocyclopropane of the empirical formula $C_3H_5NO_2$. Its infrared pattern shows distinctive nitro peaks in the middle infrared region and the cyclopropyl ring absorption at $1.64\mu$. Catalytic reduction with platinum oxide as catalyst in ethanol produces 80% of the theoretical yield of cyclopropylamine, which again is identified by its infrared pattern.

*Example 2*

Within a period of 90 minutes, 281 grams of mixed halonitropropanes containing 50% 1-iodo-3-nitropropane (0.657 mole) and 15% 1-chloro-3-nitropropane (0.343 mole) are added dropwise to 900 ml. of liquid ammonia containing 62.4 grams (1.6 moles) of sodium amide. The mixture, initially at a temperature of −33° C. is stirred overnight and allowed to warm up to room temperature while ammonia evaporates. The residual liquid is diluted with 500 ml. of anhydrous ether and filtered. After stripping the solvent, as gas chromatographic analysis of the residue (54.3 grams) shows the presence of 86.4% nitrocyclopropane. Distillation at 33° C. and 8 mm. pressure produces a yield of 54% (based on total amount of 1-halo-3-nitropropanes used) of theory of 97.5% pure nitrocyclopropane.

When, in the above example, sodium amide is replaced by 36.8 grams of lithium amide (1.6 moles) at otherwise identical process steps, a yield of 43.5% of the theoretical yield of pure nitrocyclopropane is obtained. A similar result is obtained by replacing lithium amide with an equimolar amount of potassium amide.

It will be seen from the foregoing examples that the process of the present invention produces high yields of very pure nitrocyclopropane through an extremely simple reaction involving no special equipment and no purified starting material. It is, however, of extreme importance that the 1-halo-3-nitropropane used as starting material contains a major fraction of 1-iodo-3-nitropropane, since the corresponding chloro derivative of nitropropane submits to ring closure, under the best conditions, only with about a 10% yield. Furthermore, it is important that the conversion of 1-iodo-3-nitropropane to nitrocyclopropane with an alkali metal amide is performed in liquid ammonia, since other media such as anhydrous organic systems result in the formation of tars.

Although equimolar amounts of alkali metal amide theoretically are sufficient for promoting ring closure in the process of the present invention, an excess thereof is ordinarily preferred. For best results, therefore, 1.1 to 5.0 moles of alkali metal amide is employed per mole of 1-iodo-3-nitropropane.

Others may practice the invention in any of the numerous ways which will be suggested to one skilled in the art by the present disclosure. All such practice of the invention is considered to be a part hereof provided it falls within the scope of the appended claims.

I claim:
1. The process of preparing nitrocyclopropane consisting essentially in
    reacting a 1-halo-3-nitropropane which comprises a major proportion of 1-iodo-3-nitropropane with an alkali metal amide in liquid ammonia.
2. The process of claim 1 wherein said 1-halo-3-nitropropane is substantially pure 1-iodo-3-nitropropane.
3. The process of claim 1 wherein said 1-halo-3-nitropropane comprises at least 50% 1-iodo-3-nitropropane with the remainder being 1-chloro-3-nitropropane.
4. The process of claim 1 wherein said 1-halo-3-nitropropane is prepared by refluxing 1-chloro-3-nitropropane with excess alkali metal iodide in acetone.
5. The process of claim 1 wherein said alkali metal amide is used in an amount of 1.1–5.0 moles per mole of 1-halo-3-nitropropane.

No references cited.